United States Patent
Campbell

(10) Patent No.: US 11,953,083 B2
(45) Date of Patent: Apr. 9, 2024

(54) SYSTEMS AND METHODS FOR ABATEMENT OF GEAR RATTLE UTILIZING AXIAL DEFLECTION

(71) Applicant: Muncie Power Products, Inc., Muncie, IN (US)

(72) Inventor: Samuel W. Campbell, Sapulpa, OK (US)

(73) Assignee: Muncie Power Products, Inc., Muncie, IN (US)

( * ) Notice: Subject to any disclaimer, the term of this patent is extended or adjusted under 35 U.S.C. 154(b) by 105 days.

(21) Appl. No.: 17/063,880

(22) Filed: Oct. 6, 2020

(65) Prior Publication Data
US 2021/0102615 A1 Apr. 8, 2021

Related U.S. Application Data

(60) Provisional application No. 62/911,422, filed on Oct. 7, 2019.

(51) Int. Cl.
*F16H 57/00* (2012.01)
*F16H 57/021* (2012.01)
*F16H 57/028* (2012.01)

(52) U.S. Cl.
CPC ....... *F16H 57/0006* (2013.01); *F16H 57/021* (2013.01); *F16H 57/028* (2013.01)

(58) Field of Classification Search
CPC .............. F16H 57/0006; F16H 57/022; F16H 2057/0222; F16H 57/12; F16H 2057/126; F16H 2057/127; F16H 55/18
See application file for complete search history.

(56) References Cited

U.S. PATENT DOCUMENTS

| | | | | |
|---|---|---|---|---|
| 4,036,074 A | * | 7/1977 | Bodnar | F16H 55/18 74/403 |
| 4,528,862 A | * | 7/1985 | Goldowsky | F16H 57/12 74/440 |
| 5,042,315 A | * | 8/1991 | Fahy | F16H 57/12 74/411 |
| 7,748,288 B2 | | 7/2010 | Chevalier et al. | |
| 9,765,873 B2 | | 9/2017 | Burrell et al. | |
| 2009/0114045 A1 | | 5/2009 | Wilson et al. | |
| 2018/0003286 A1 | | 1/2018 | Burrell et al. | |

* cited by examiner

*Primary Examiner* — Jake Cook
(74) *Attorney, Agent, or Firm* — Daniel L. Boots; Brian W. Chellgren; Dentons Bingham Greenbaum LLP

(57) ABSTRACT

Power takeoff devices (PTOs) are useful for mounting on transmissions and for performing, directly or indirectly, useful work via the mechanical energy generated by the PTO's rotatable output shaft. Systems and methods for reducing PTO gear rattle include an input gear carried on a shaft sleeve mounted on a shaft extending between opposing spaced apart walls of a PTO housing. The shaft sleeve is moveable in an axial direction along the shaft, the travel of the shaft sleeve in each direction being limited by contacting the respective wall. The shaft sleeve is biased to remain spaced apart from the walls, thereby reducing or eliminating gear rattle.

13 Claims, 7 Drawing Sheets

SYSTEMS AND METHODS FOR ABATEMENT OF GEAR RATTLE UTILIZING AXIAL DEFLECTION

CROSS-REFERENCE TO RELATED APPLICATIONS

This application claims the benefit of U.S. provisional patent application Ser. No. 62/911,442 filed Oct. 7, 2019, for SYSTEMS AND METHODS FOR ABATEMENT OF GEAR RATTLE BY AXIAL DEFLECTION, incorporated herein by reference.

FIELD

This relates to power takeoff devices (PTOs), which are useful for mounting on transmissions and for performing, directly or indirectly, useful work via the PTO's rotatable output shaft.

BACKGROUND

The use of a PTO in association with vehicle (e.g., truck) or stationary engine transmissions is generally known. Such PTOs often include an input gear for connection to an input shaft or transmission, an output gear for connection to an output shaft and, optionally, a clutch mechanism for selectively engaging and disengaging power to the output shaft so as to selectively rotate the output shaft of the PTO to perform useful work, such as to power an auxiliary device of a work truck. Once connected to a gear within the transmission, the input gear of the PTO is connected to and can draw mechanical power from the transmission and can selectively transfer this power to the auxiliary device connected to the PTO.

Mechanical engagement of gears involves engineering challenges, as the distance between the rotational axis of each gear may vary due to differential thermal expansion, manufacturing tolerances, or other reasons commonly known in the industry. Any change in the distance between the rotational axes of engaged gears, however slight, typically creates a corresponding change in the operating clearance or "backlash" between mating or meshing teeth disposed around the perimeter of each gear. Insufficient clearance results in an overly tight meshing of teeth, creating an undesirable "whine" meshing noise and increasing the risk of surface damage and failure. Excessive clearance results in an overly loose meshing of teeth, wherein repeated impacts between spaced apart teeth create an undesirable "rattle" noise and increase the wear on teeth.

The inventors of the present disclosure realized that improvements in gear systems in PTOs are needed to mitigate such undesirable noise. Certain preferred features of the present disclosure address these and other needs and provide other important advantages.

SUMMARY

Systems and methods for reducing PTO gear rattle include an input gear carried on a shaft sleeve mounted on a shaft extending between opposing spaced apart walls of a PTO housing. The shaft sleeve is moveable in an axial direction along the shaft, the travel of the shaft sleeve in each direction being limited by contacting the respective wall. The shaft sleeve is biased to remain spaced apart from the walls, thereby reducing or eliminating gear rattle.

In some embodiments, the disclosed invention is a gear system for a power takeoff including a PTO housing including a first wall opposing and spaced apart from a second wall, a shaft extending between the first wall and the second wall, a shaft sleeve carried on the shaft, and an input gear carried on the shaft sleeve, wherein the shaft sleeve is axially moveable along the shaft between the first wall and the second wall. In further embodiments, the gear system includes a biasing mechanism positioned between the shaft sleeve and the PTO housing, wherein the biasing mechanism biases the shaft sleeve away from the PTO housing. In certain embodiments, the biasing mechanism is at least one spring, two springs, three springs, four springs, or a plurality of springs. In some embodiments, the shaft sleeve includes opposing first and second ends, and the biasing mechanism is positioned between the first end and first wall and between the second end and the second wall. In further embodiments, movement of the shaft sleeve axially along the shaft is restricted by contact between the first end and the first wall, and by contact between the second end and the second wall. In certain embodiments, at least one of the shaft sleeve and the PTO housing include a cavity, and wherein the biasing mechanism is positioned at least partially within the cavity. In some embodiments, the shaft sleeve encircles the shaft. In further embodiments, the shaft is non-rotatable with respect to the PTO housing. In certain embodiments, the shaft sleeve is rotatable about the shaft. In some embodiments, the input gear is rotatable about the shaft sleeve. In further embodiments, the gear system includes one or more of rotary bearings positioned between the shaft sleeve and the input gear, an output gear engaging the input gear, and a gap between the first wall and the second wall, and wherein the shaft sleeve includes a length less than the gap. In certain embodiments, movement of the shaft sleeve along the shaft is restricted by contact between the shaft sleeve and the PTO housing. In some embodiments, the input gear and output gear are both helical gears.

In further embodiments, the disclosed invention is a power takeoff including PTO housing including a first wall opposing and spaced apart from a second wall, a shaft extending between the first wall and the second wall, a shaft sleeve carried on the shaft and axially moveable along the shaft between the first wall and the second wall, and a biasing mechanism positioned between the shaft sleeve and the first wall and between the shaft sleeve and the second wall, wherein the biasing mechanism biases the shaft sleeve away from the first wall and away from the second wall. In certain embodiments, the power takeoff includes an input gear carried on the shaft sleeve, wherein the input gear is rotatable about the shaft sleeve. In some embodiments, the power takeoff includes a gap between the first wall and the second wall, and wherein the shaft sleeve includes a length less than the gap. In further embodiments, the input gear is a helical gear.

In some embodiments, the disclosed invention is a method for reducing gear rattle including the steps of providing a power takeoff including a PTO housing having a first wall opposing and spaced apart from a second wall and a gap between the first wall and the second wall, a shaft extending between the first wall and the second wall, a moveable shaft sleeve carried on the shaft within the gap, the shaft sleeve having opposing first and second ends, and an input gear carried on the shaft sleeve, and biasing the shaft sleeve to remain centered within the gap by, using a biasing mechanism, biasing the first end away from the first wall and biasing the second end away from the second wall. In further embodiments, the biasing mechanism is positioned between the first end and the first wall and between the second end and the second wall. In certain embodiments, the input gear is a helical gear.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE ILLUSTRATED EMBODIMENTS

Figure 1:
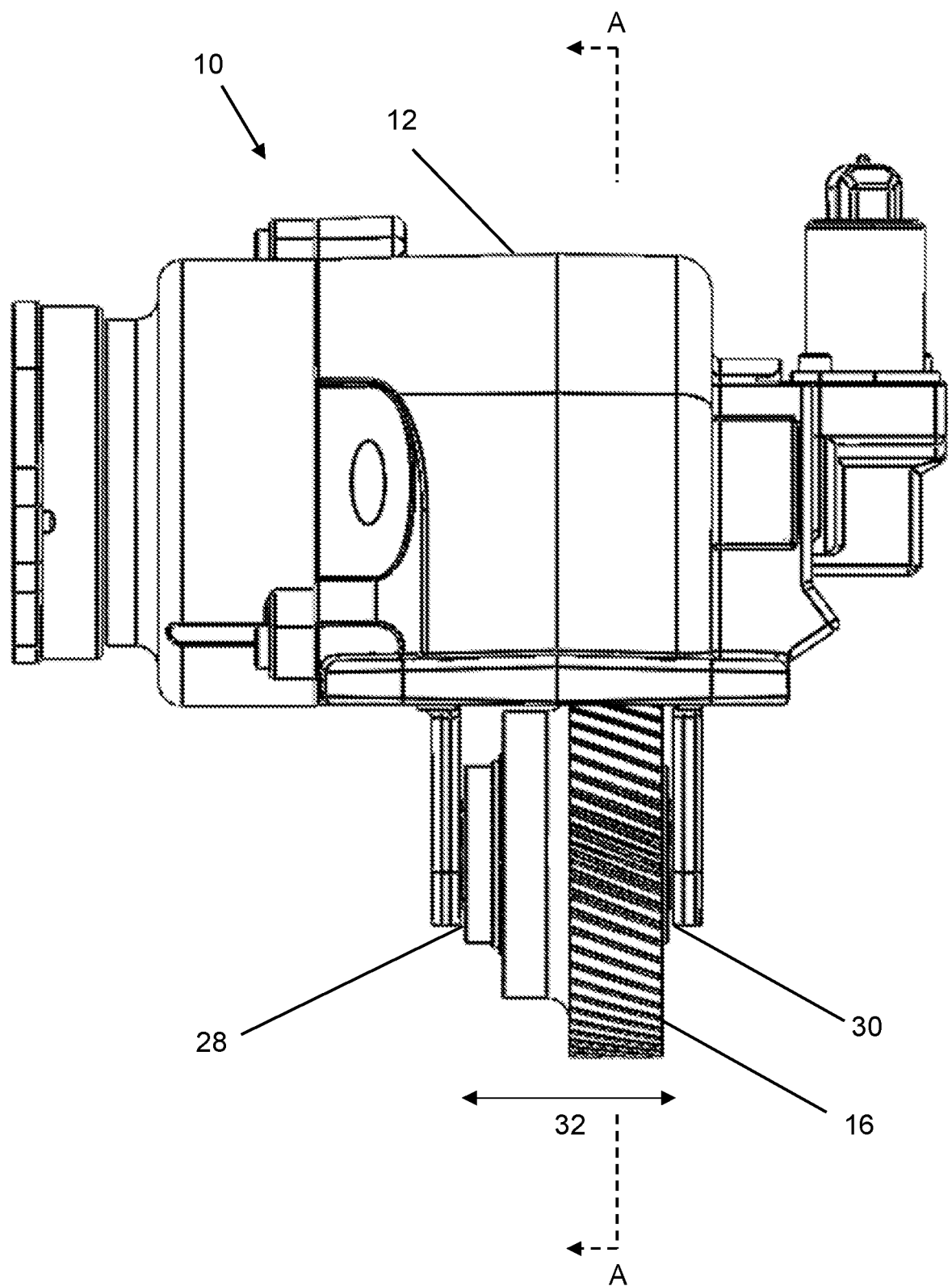
FIG. 1 depicts a top view of a PTO according to a first embodiment of the present invention.
Figure 2:
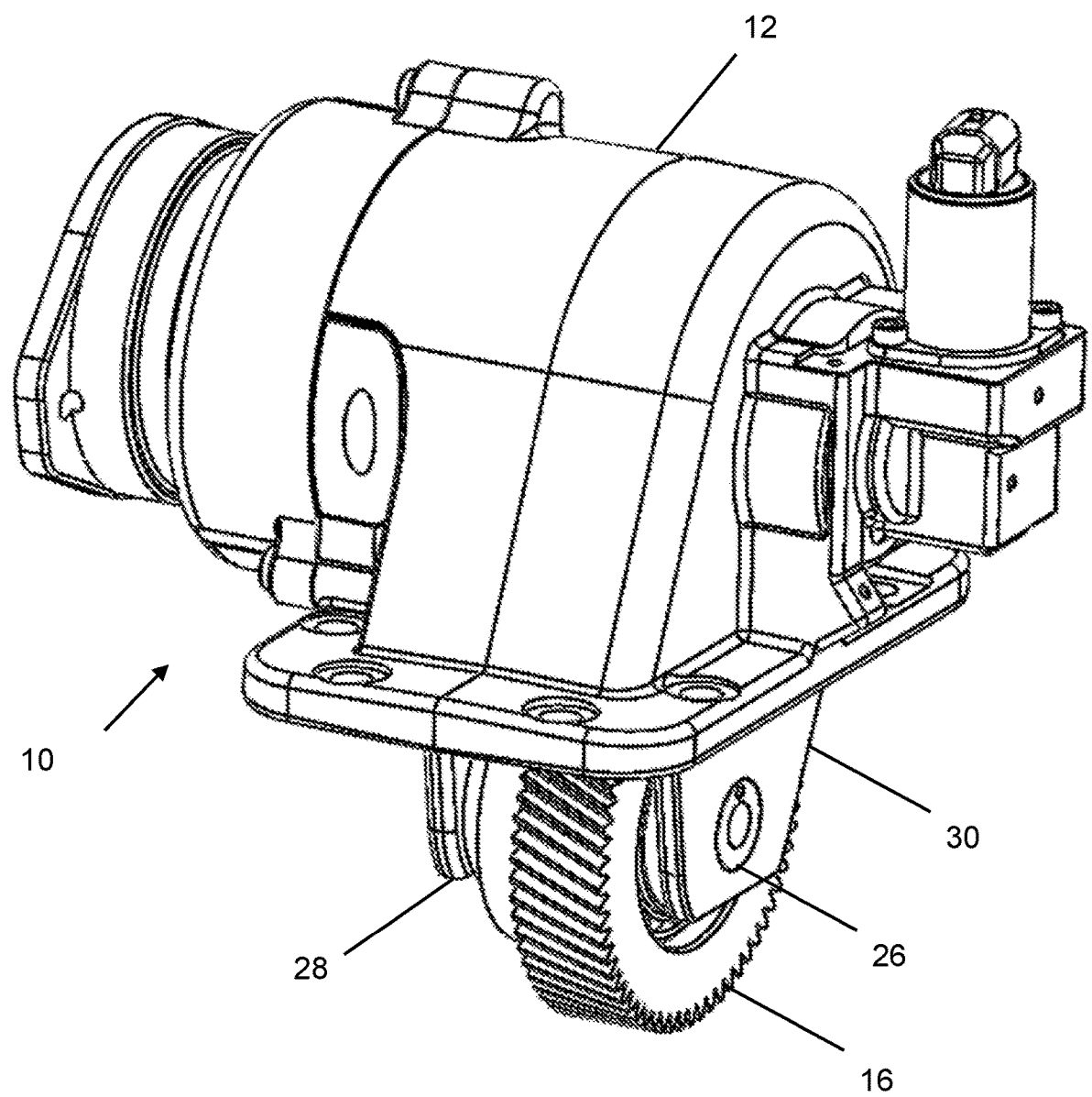
FIG. 2 depicts a perspective view of the PTO of FIG. 1.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present invention include a gear system for a PTO configured to reduce or eliminate gear rattle by absorbing vibrations between mating teeth in an input gear and transmission gear and output gear engaged therewith.

Depicted in FIGS. 1-6 is a PTO 10 according to a first embodiment of the present invention. The PTO 10 includes a housing 12, an output gear 14 and an input gear 16. The input gear 16 is located between and engages both the output gear 14 and a transmission gear (not shown). Each of the output gear 14 and input gear 16 include a plurality of teeth 18, 20, respectively, disposed about the perimeter of the gear. The teeth 20 of the input gear 16 are in meshing engagement with the teeth 18 of the output gear 14 and are intended for engagement with teeth of the transmission gear such that the three gears are rotationally coupled. The PTO 10 is configured to accept rotational power input from the transmission gear by engaging it with the input gear 16. Rotational power is transferred from the input gear 16 to the output gear 14, then delivered to an output shaft 22 connected to the output gear 14 to perform useful work, such as to power an auxiliary device.

The input gear 16 is carried on a shaft sleeve 24 carried on and encircling a shaft 26. The shaft sleeve 24 and the carried input gear 16 are moveable in an axial direction along the shaft 26. In some embodiments, a set screw (not shown) prevents the shaft 26 from rotating relative to the PTO housing 12. A small radial gap 25 between an inner diameter of shaft sleeve 24 and the outer diameter of shaft 26 allows for axial movement of shaft sleeve 24 along the shaft 26. In some embodiments, the gap 25 may be about 0.001". In some embodiments, a lubricant, such as oil, may be placed in the radial gap 25 to facilitate movement of the shaft sleeve 24 along the shaft 26. In some embodiments, shaft sleeve 24 is rotatable about shaft 26, in addition to being axially moveable. In other embodiments, shaft sleeve 24 is non-rotatable about the shaft 26 while remaining moveable in an axial direction. Bearings, such as rotary bearings, or, in the depicted embodiment, tapered roller bearings 27, allow input gear 16 to rotate about the shaft sleeve 24.

Figure 4:
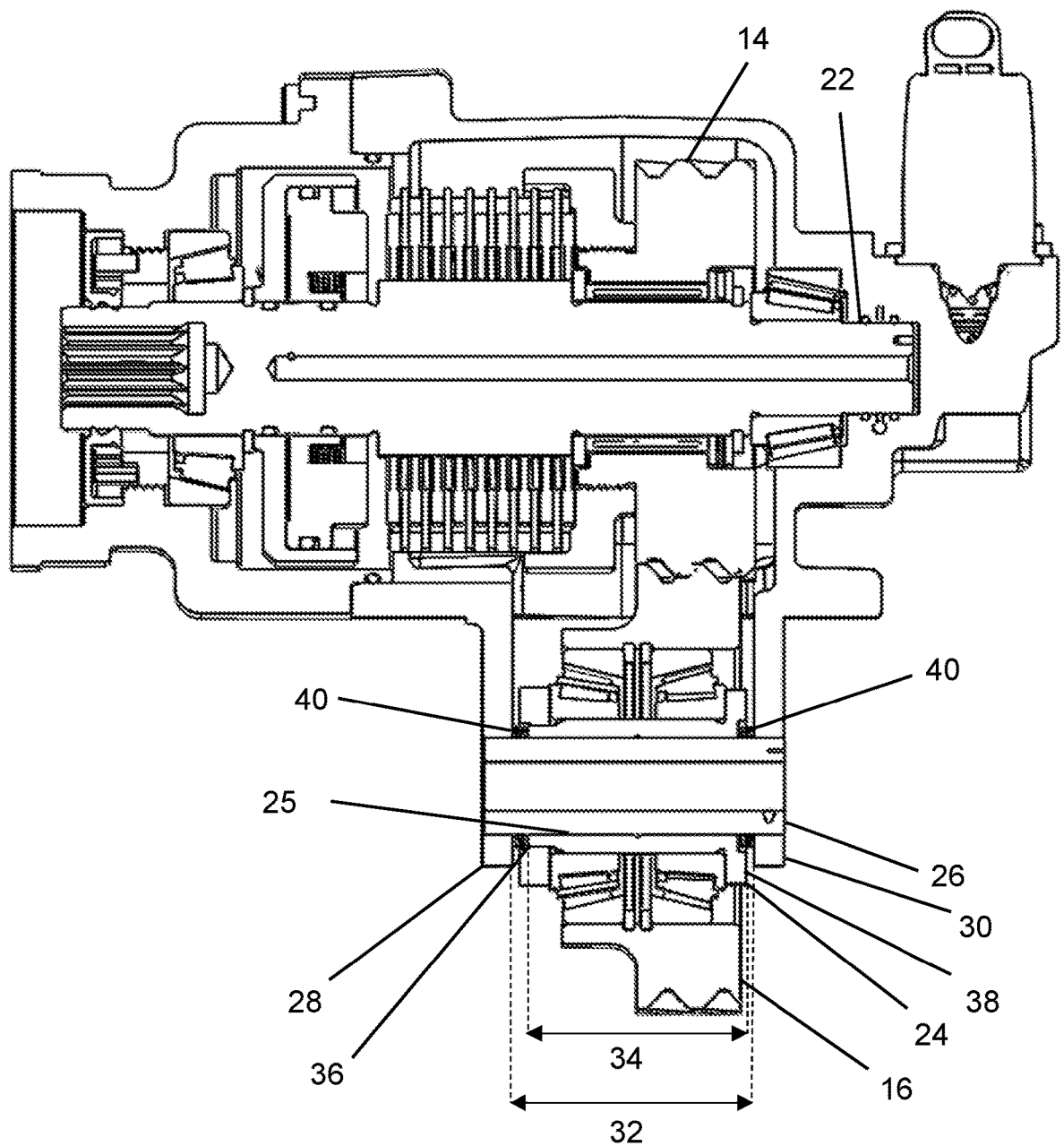
FIG. 4 depicts a side cross-sectional view of the PTO along lines B-B of FIG. 3.

The PTO housing 12 includes opposing spaced-apart first wall 28 and second wall 30, having a gap 32 therebetween. The shaft 26 extends across the gap 32 in an axial direction. The shaft sleeve 24 has a length 34 and extends along the shaft 26 in an axial direction. As shown in FIG. 4, the length 34 of the shaft sleeve 24 is less than the gap 32. A first end 36 of the shaft sleeve 24 faces the first wall 28 and a second end 38 of the shaft sleeve 24 faces the second wall 30, with a biasing mechanism, such as, for example, springs 40, positioned between the first end 36 and first wall 28 and between the second end 38 and second wall 30. In the depicted embodiment, the ends 36, 38 each include a cavity 42 wherein the springs 40 are each located at least partially within the cavities 42 and extend from the cavities 42 in the direction of their respective walls 28, 30. While FIGS. 4, 5, 6A, and 6B show one coil spring 40, each in its own cavity 42, in each end 36, 38, it should be understood that different configurations of springs (e.g., 1, 2, 3, or more springs) and cavities (e.g., 1 spring per cavity, 2 springs sharing the same cavity, etc.) are within the scope of this invention. Furthermore, the biasing mechanism may be coil springs, torsion springs, leaf springs, opposing magnets, or other biasing mechanisms known in the art. While the depicted embodiment shows cavities 42 in the ends 36, 38 of the shaft sleeve 24, in other embodiments, the cavities may be formed in the PTO housing itself.

Figure 3:
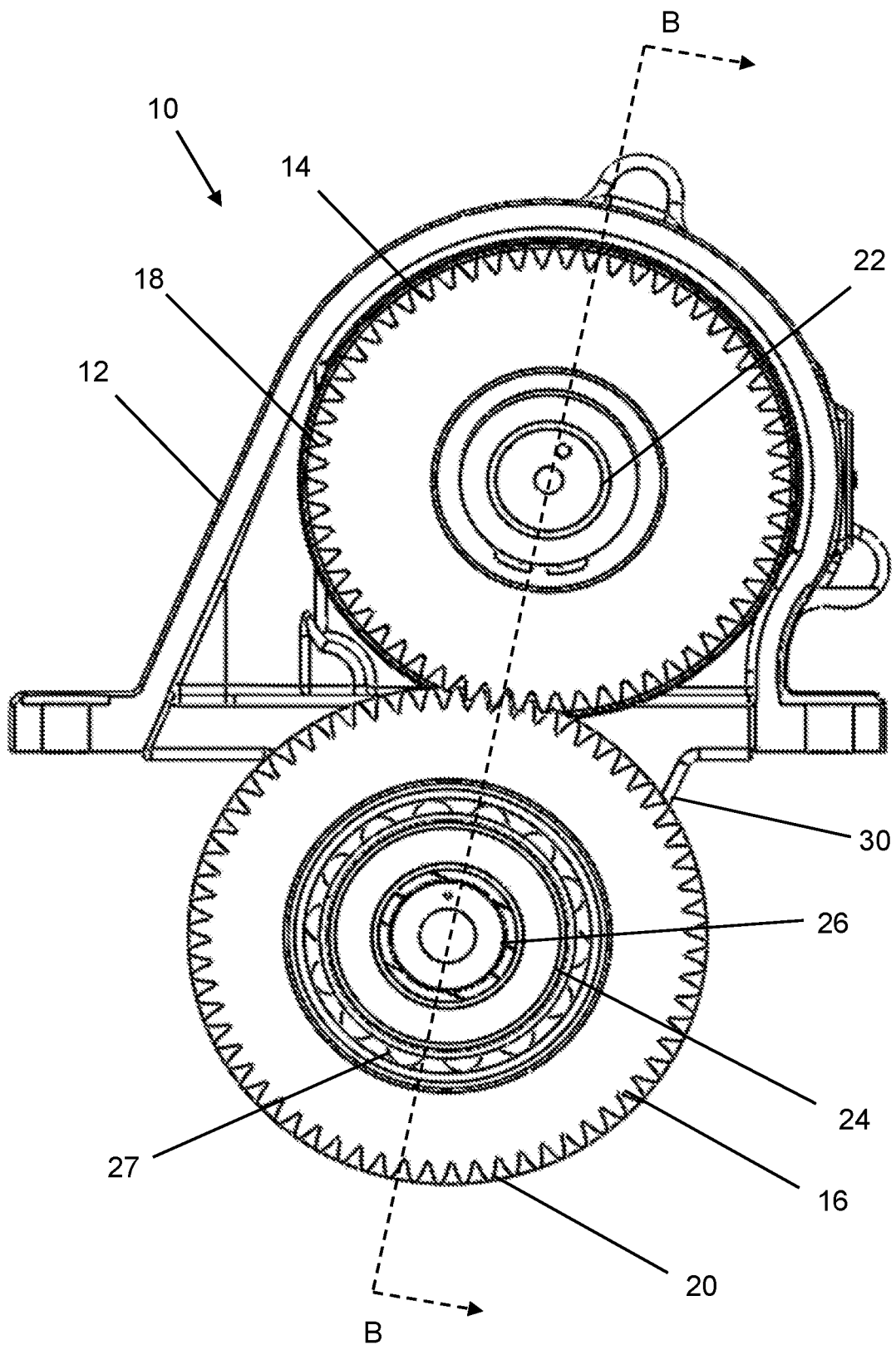
FIG. 3 depicts a side cross-sectional view of the PTO along lines A-A of FIG. 1
Figure 5:
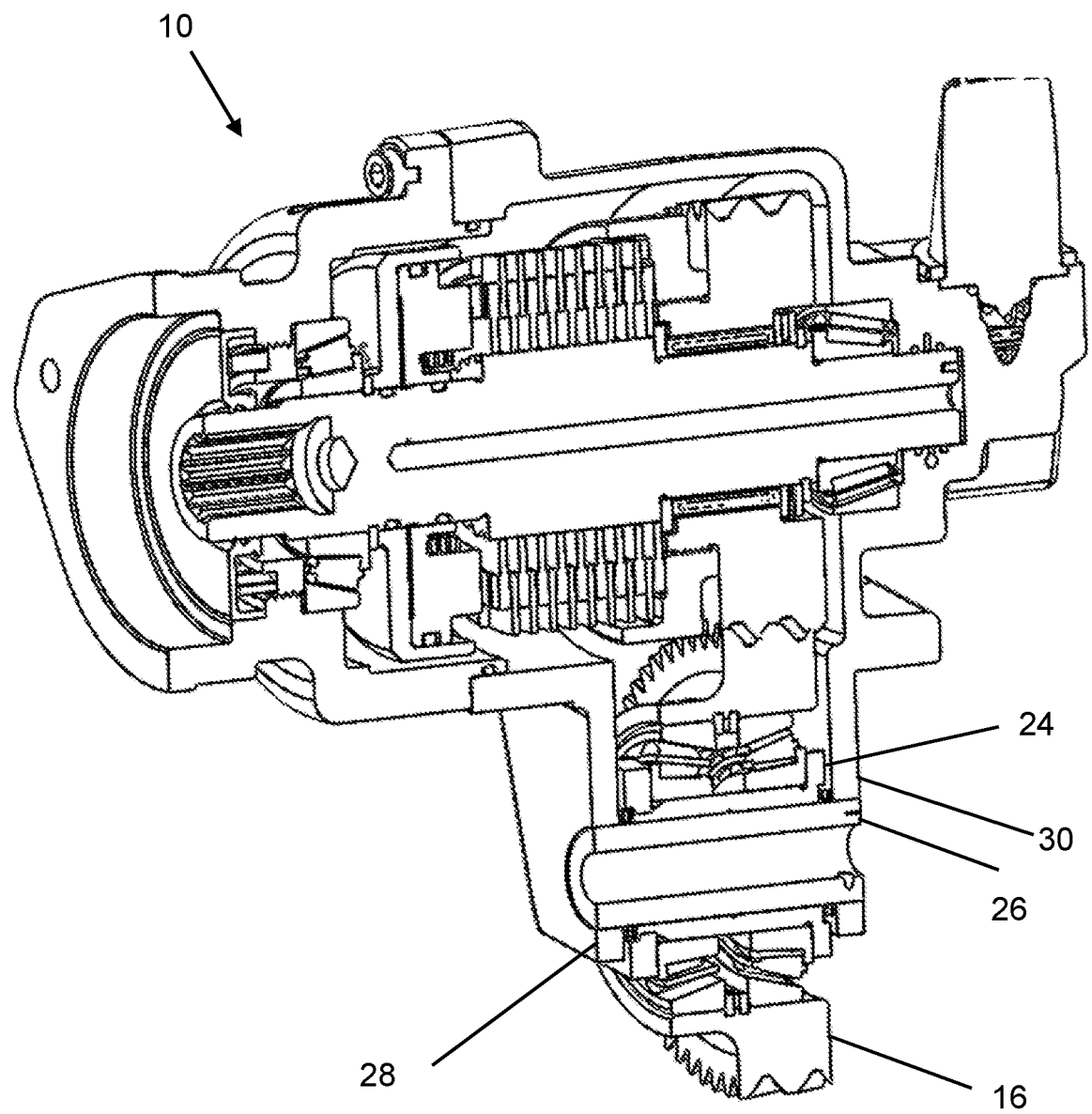
FIG. 5 depicts a perspective cross-sectional view of the PTO along lines B-B of FIG. 3.

The springs 40 are configured to allow the shaft sleeve 24 to move in a linear path (shown by large arrows in FIGS. 6A and 6B) having a single degree of freedom along the axis of the shaft 26, substantially perpendicular to the walls 28, 30, and substantially perpendicular to a centerline between the shaft 26 and output shaft 22 (shown as line B-B in FIG. 3). Linear movement of the shaft sleeve 24 along the shaft 26 in either axial direction is restricted by the shaft sleeve 24 contacting the respective wall 28, 30. Linear movement of the shaft sleeve 24 and carried input gear 16 in an axial direction along the shaft 24 does not substantially change the distance between the input gear 16 and output gear 14. Springs 40 bias the shaft sleeve 24 to a second position centered within the gap 32, as shown in FIGS. 4 and 5, reducing gear rattle and absorbing vibration.

Figure 6A:
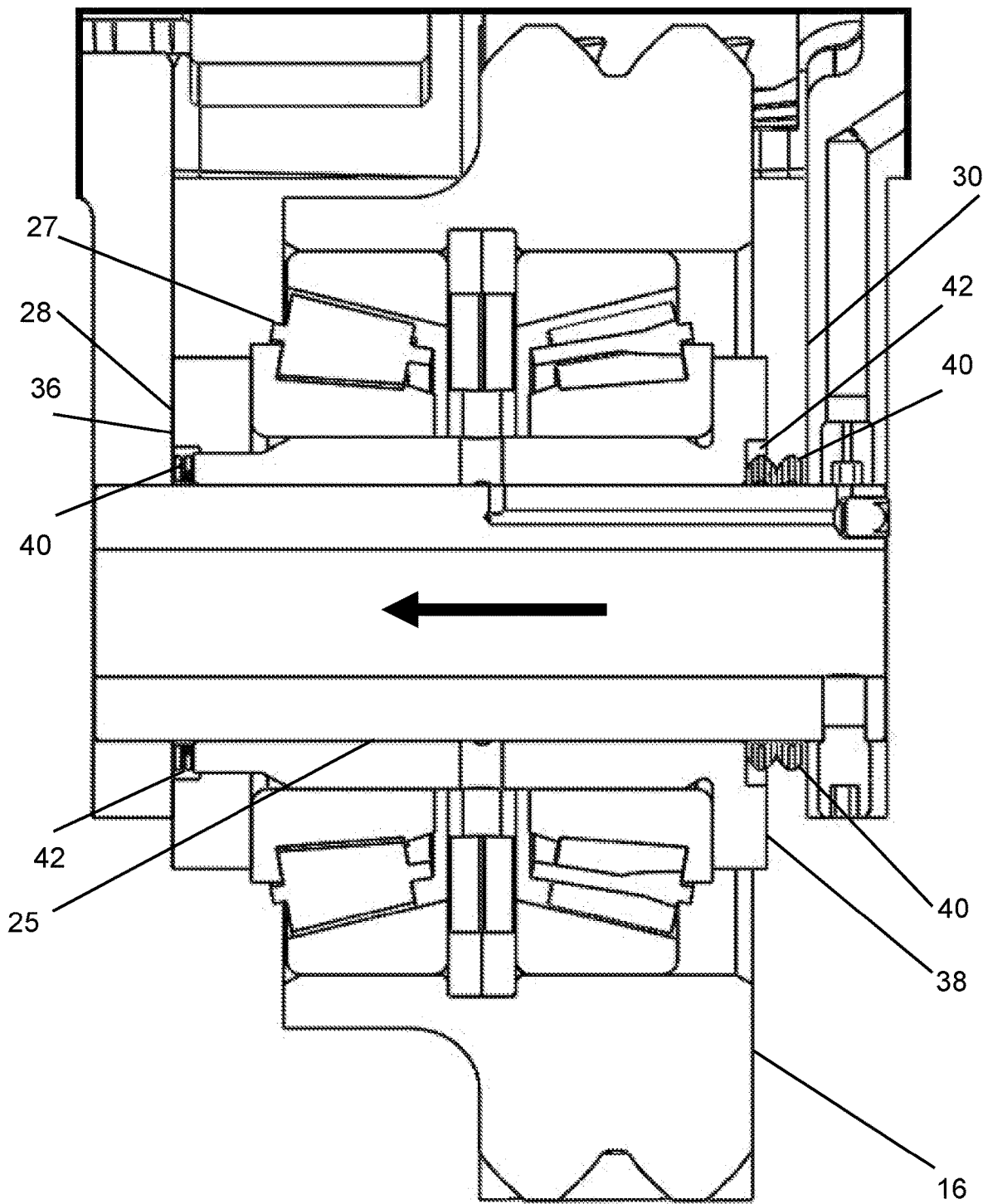
FIG. 6A depicts a magnified view of FIG. 4 with the shaft sleeve shifted to the left.

Referring to FIG. 6A, application of a torque in the direction of the first end 36 (i.e., leftwards, as shown by the large arrow) to the input gear 16, moves the shaft sleeve 24 to a first position, such that springs 40 on the first end 36 are compressed and fit substantially entirely within their respective cavities 42, such that the first end 36 of the shaft sleeve 24 abuts against the first wall 28 of the PTO housing 12, while springs 40 on the second end 38 are disposed in an extended configuration.

Figure 6B:
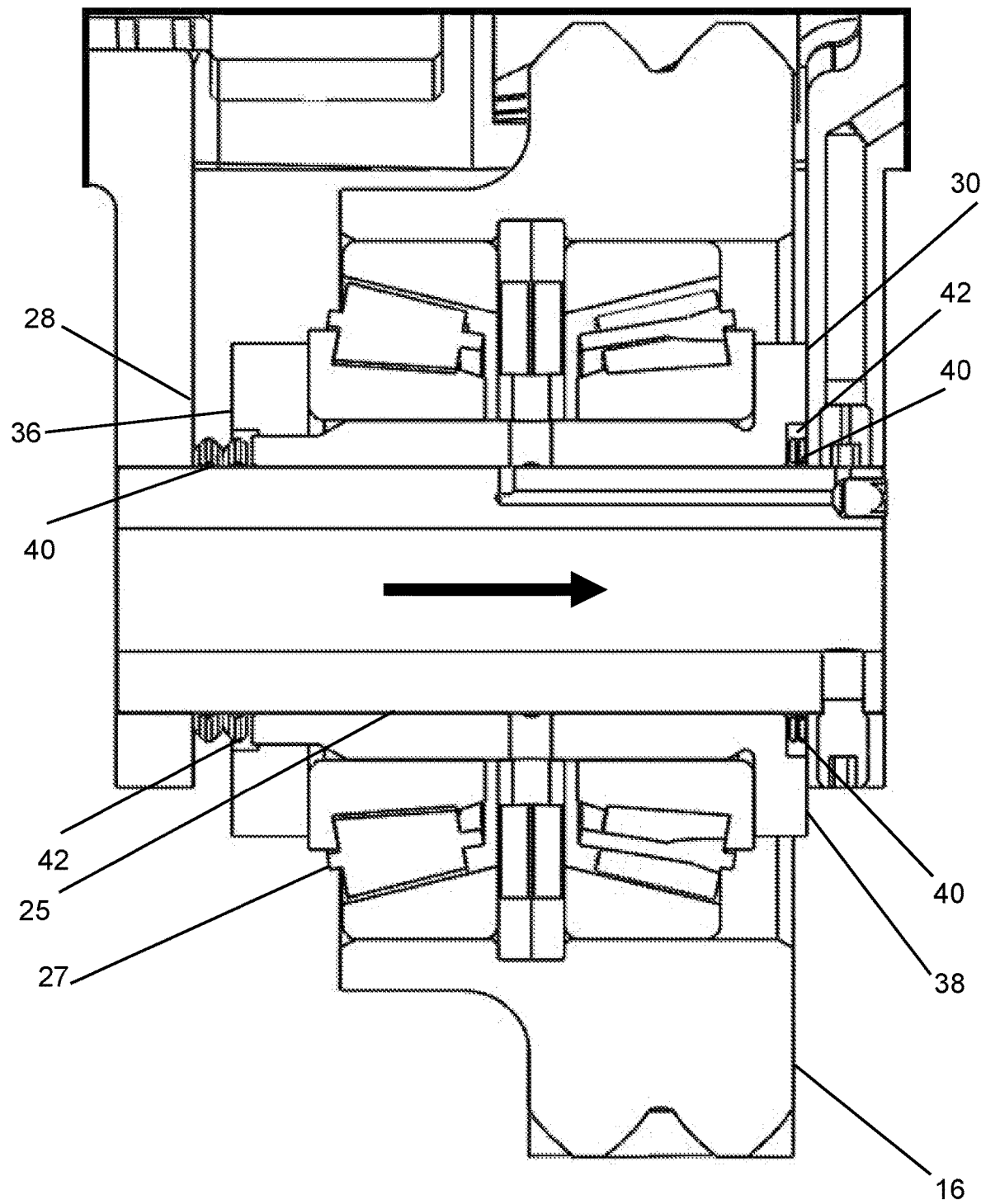
FIG. 6B depicts a magnified view of FIG. 4 with the shaft sleeve shifted to the right.

Referring to FIG. 6B, application of a torque in the direction of the second end 38 (i.e., rightwards, as shown by the large arrow) to the input gear 16, moves the shaft sleeve 24 to a third position, such that springs 40 on the second end 38 are compressed and fit substantially entirely within their respective cavities 42, such that the second end 38 of the shaft sleeve 24 abuts against the second wall 30 of the PTO housing 12, while springs 40 on the first end 36 are disposed in an extended configuration.

The input gear 16, output gear 14, and transmission gear (not shown) are helical gears, so the transfer of rotational power has both an axial and radial force. Mechanical rotational power from the transmission gear (not shown) applied to the input gear 16 causes the input gear 16 and shaft sleeve 24 to move linearly in an axial direction, changing the backlash between the gears, until the shaft sleeve 24 physically contacts the PTO housing 12 on either first wall 28 or second wall 30, depending on the direction of applied torque, whereby the mechanical rotational power is transferred from the transmission gear to the input gear 16, to the output gear 14 to perform useful work. When mechanical rotational power is not applied, as typically occurs when the PTO clutch is disengaged and there is no load on the PTO, springs 40 bias the shaft sleeve 24 to a centered position (shown best in FIG. 5), which presses the moveable helical input gear 16 against the helical output gear 14 and transmission gear (not shown), thereby reducing or eliminating undesirable gear rattle.

Reference systems that may be used herein can refer generally to various directions (e.g., top, bottom, leftward, rightward, forward and rearward), which are merely offered to assist the reader in understanding the various embodiments of the disclosure and are not to be interpreted as limiting. It should be understood that the disclosed PTO housing may be mounted at different locations and different orientations with respect to different engines and transmissions. Other reference systems may be used to describe various embodiments.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A gear system for a power takeoff, comprising:
   a PTO housing including a first wall opposing and spaced apart from a second wall;
   a shaft extending between the first wall and the second wall;
   a shaft sleeve carried on the shaft, wherein the shaft sleeve includes opposing first and second ends;
   an input gear carried on the shaft sleeve; and
   a biasing mechanism positioned between the shaft sleeve and at least one of the first wall and the second wall, wherein the biasing mechanism biases the shaft sleeve away from the at least one of the first wall and the second wall;
   wherein the shaft sleeve is axially moveable along the shaft between the first wall and the second wall; and
   wherein the biasing mechanism includes a first component positioned between the first end and first wall and a second component positioned between the second end and the second wall.

2. The gear system of claim 1, wherein one at least one of the first component and the second component is a spring.

3. The gear system of claim 1, wherein movement of the shaft sleeve axially along the shaft is restricted by contact between the first end and the first wall, and by contact between the second end and the second wall.

4. A gear system for a power takeoff, comprising:
   a PTO housing including a first wall opposing and spaced apart from a second wall;
   a shaft extending between the first wall and the second wall;
   a shaft sleeve carried on the shaft;
   an input gear carried on the shaft sleeve; and
   a biasing mechanism positioned between the shaft sleeve and at least one of the first wall and the second wall, wherein the biasing mechanism biases the shaft sleeve away from the at least one of the first wall and the second wall;

wherein the shaft sleeve is axially moveable along the shaft between the first wall and the second wall;

wherein at least one of the shaft sleeve and the PTO housing include a cavity, and wherein the biasing mechanism is positioned at least partially within the cavity.

5. The gear system of claim 1, wherein the shaft sleeve encircles the shaft.

6. A gear system for a power takeoff, comprising:
a PTO housing including a first wall opposing and spaced apart from a second wall;
a shaft extending between the first wall and the second wall;
a shaft sleeve carried on the shaft; and
an input gear carried on the shaft sleeve;
wherein the shaft sleeve is axially moveable along the shaft between the first wall and the second wall; and
wherein the shaft is non-rotatable with respect to the PTO housing.

7. A gear system for a power takeoff, comprising:
a PTO housing including a first wall opposing and spaced apart from a second wall;
a shaft extending between the first wall and the second wall;
a shaft sleeve carried on the shaft; and
an input gear carried on the shaft sleeve;
wherein the shaft sleeve is axially moveable along the shaft between the first wall and the second wall; and
wherein the shaft sleeve is rotatable about the shaft.

8. A gear system for a power takeoff, comprising:
a PTO housing including a first wall opposing and spaced apart from a second wall;
a shaft extending between the first wall and the second wall;
a shaft sleeve carried on the shaft; and
an input gear carried on the shaft sleeve;
wherein the shaft sleeve is axially moveable along the shaft between the first wall and the second wall; and
wherein the input gear is rotatable about the shaft sleeve.

9. The gear system of claim 8, further comprising rotary bearings positioned between the shaft sleeve and the input gear.

10. The gear system of claim 1, further comprising an output gear engaging the input gear.

11. The gear system of claim 1, further comprising a gap between the first wall and the second wall, and wherein the shaft sleeve includes a length less than the gap.

12. A gear system for a power takeoff, comprising:
a PTO housing including a first wall opposing and spaced apart from a second wall;
a shaft extending between the first wall and the second wall;
a shaft sleeve carried on the shaft; and
an input gear carried on the shaft sleeve;
wherein the shaft sleeve is axially moveable along the shaft between the first wall and the second wall; and
wherein movement of the shaft sleeve along the shaft is restricted by contact between the shaft sleeve and the PTO housing.

13. The gear system of claim 1, wherein the input gear is a helical gear.

* * * * *

UNITED STATES PATENT AND TRADEMARK OFFICE
CERTIFICATE OF CORRECTION

| | | |
|---|---|---|
| PATENT NO. | : 11,953,083 B2 | Page 1 of 1 |
| APPLICATION NO. | : 17/063880 | |
| DATED | : April 9, 2024 | |
| INVENTOR(S) | : Samuel W. Campbell | |

It is certified that error appears in the above-identified patent and that said Letters Patent is hereby corrected as shown below:

In the Specification

Column 1, in the paragraph immediately following the header Cross-Reference to Related Applications, please delete "62/911,442" and insert in lieu thereof --62/911,422--.

In the Claims

Column 6, Claim 2, Line 50, delete the word "one" that immediately follows the word "wherein".

Signed and Sealed this
Thirteenth Day of August, 2024

Katherine Kelly Vidal
*Director of the United States Patent and Trademark Office*